United States Patent [19]

Bentson et al.

[11] Patent Number: 5,298,311
[45] Date of Patent: Mar. 29, 1994

[54] MOISTURE AND OXIDATION RESISTANT CARBON/CARBON COMPOSITES

[75] Inventors: Larry D. Bentson, Brecksville; Robert J. Price, Hudson; Mark J. Purdy; Edward R. Stover, both of Akron, all of Ohio

[73] Assignee: The B. F. Goodrich Company, Akron, Ohio

[21] Appl. No.: 450,145

[22] Filed: Dec. 13, 1989

[51] Int. Cl.$^5$ .............................................. B32B 9/00
[52] U.S. Cl. ................................. 428/216; 428/212; 428/213; 428/319.1; 428/307.7; 428/323; 428/330; 428/408; 428/446; 428/469; 428/697; 428/698; 428/699; 428/701; 428/702
[58] Field of Search ............... 428/408, 698, 704, 697, 428/699, 701, 702, 446, 469, 330, 323, 213, 212, 307.7, 367, 427, 366, 319.1, 68, 336, 216

[56] References Cited

U.S. PATENT DOCUMENTS

| | | | |
|---|---|---|---|
| 3,914,508 | 10/1975 | Hooten et al. | 428/408 |
| 3,936,574 | 2/1976 | Marin | 428/408 |
| 4,461,806 | 7/1984 | Ikeda et al. | 428/408 |
| 4,465,777 | 8/1984 | Shuford | 501/88 |
| 4,515,860 | 5/1985 | Holzl | 428/408 |
| 4,558,579 | 4/1986 | Strangman et al. | 428/408 |
| 4,582,751 | 4/1986 | Vasilos et al. | 428/408 |
| 4,599,256 | 7/1986 | Vasilos | 428/408 |
| 4,795,677 | 1/1989 | Gray | 428/408 |
| 4,863,773 | 9/1989 | Rousseau et al. | 428/68 |
| 4,868,056 | 9/1989 | Haselkorn | 428/698 |
| 4,892,790 | 1/1990 | Gray | 428/408 |
| 4,894,286 | 1/1990 | Gray | 428/408 |

OTHER PUBLICATIONS

Performance Evaluations of Oxidation-Resistant Carbon-Carbon Composites in Simulated Hypersonic Vehicle Environments, D. M Barrett, W. L. Vaughn, H. G. Maahs, C. W. Ohlhorst and R. H. Martin, Dayton, Jun. 1989.

AFWAL-TR-88-4071—Proceedings of the Air Force Workshop on Oxidation Protected Carbon-Carbon Composites (Below 3000° F.) I. Bush, D. Schmidt, R. Tomashot, Mar. 1988.

"Ceramic Coatings for Carbon-Carboon Composites", J. R. Strife and J. E. Sheehan, Ceramic Bulletin, vol. 67, Nov. 2, 1988.

Primary Examiner—A. A. Turner
Attorney, Agent, or Firm—David M. Ronyak

[57] ABSTRACT

Carbon/carbon composites including those structures formed from a fibrous reinforcement itself formed principally from carbon in a carbon matrix are protected against oxidation by multi-layer sealant system preferably including a multi-layer paint including in its carbonized binder refractory granules and inhibitor particles that form a moisture resistant, viscosity-stabilized borate glass when exposed to a high-temperature, oxidizing environment, and an outer ceramic shell formed by CVI/CVD in situ formation of boron carbide followed by silicon carbide. The paint is prepared by mixing finely divided powders of borate precursor compounds or borate glass frit and refractory granules with a carbon char yielding precursor binder such as phenolic resin or pitch which preferably produces a highly porous structure upon carbonization.

23 Claims, 4 Drawing Sheets

MOISTURE AND OXIDATION RESISTANT CARBON/CARBON COMPOSITES

The present invention relates to carbon/carbon structural composites formed from carbonaceous fiber and densified principally employing carbon, and more particularly to carbon/carbon composites formed and treated so as to resist oxidation under a wide variety of high temperature oxidizing environments including cycling through environments during which the oxidation protection system is exposed to moisture, and to an oxidation protection system for carbonaceous substrates.

BACKGROUND OF THE INVENTION

Carbon/carbon composites include those structures formed from a fibrous reinforcement which itself consists principally of carbon and are densified for enhanced strength employing principally carbon. Such carbon/carbon composites typically are characterized by high strength, low density, and high modulus. Carbon/carbon composite materials are eminently useful in applications where high temperature strength and high strength-to-weight ratio are important. Such carbon/carbon composites may be formed, for example, by impregnating graphite fiber cloth with resinous material, layering plies of the resin impregnated graphite cloth, curing the resin under pressure and thereafter carbonizing the resin impregnated layer plies with application of heat and pressure. Densification may also be accomplished by CVD (chemical vapor deposition) or CVI (chemical vapor infiltration) of carbon or by impregnation with a resin or pitch followed by carbonization.

An important limitation to the use of carbon/carbon composites is their susceptability to oxidation in high temperature oxidizing environments. Oxidation not only attacks the surface of the carbon/carbon composite, but also enters pores that invariably are present in such structures oxidizing the carbon fibers adjacent to the pores and surfaces of the pores, and thereby weakening the composite. Such oxidative degradation is of particular concern when operating temperatures will exceed about 500° C. (932° F.).

Much effort has been and continues to be directed toward identification of methods and mechanisms for reducing or eliminating oxidative weight loss and accompanying loss of strength associated with operation of carbon/carbon composites at elevated temperatures.

One approach has been to reduce opportunities for intimate or permeating contact between the carbon/carbon composite and any oxidizing environment in which such structure exists or is operated. One mechanism for reducing such contact has focused upon sealing of the exterior surfaces of a carbon/carbon composite thereby forestalling or foreclosing entry of oxidizing agents thereinto.

It has been proposed that exterior surfaces of a carbon/carbon composite be coated with a ceramic material such as silicon carbide to prohibit entry of oxidizing agents, typically molecular or ionic oxygen from the atmosphere, into such a carbon/carbon composite. Such ceramic coatings have provided only limited success as they have been characterized by a tendency to crack as a result of thermal cycling of the coated structure. Such cracking is believed to be due to differences in coefficients of thermal expansion of the carbon/carbon composite and the ceramic coating.

It has also been proposed that exterior surfaces of carbon/carbon composites be coated with a single or multi-component glass forming seal coat such as boron or boron plus zirconium-containing substance tending to form a glass or glass-ceramic material which is to a degree flowable and amorphous in character at temperatures (e.g. 649°-1316° C. or 1200°-2400° F.) associated with the environment in which it is desired to protect the carbon/carbon composite from an oxidizing environment. Such glass forming substances have been observed to inadequately protect the carbon/carbon composites when the temperature is cycled between ambient and about 649°760° C. (1200°-1400° F.), a temperature range in which carbon/carbon composites are particularly susceptible to oxidation. A possible explanation for the somewhat disappointing performance of such glass forming materials at these temperatures lies in t he tendency for the formed glasses at those temperatures to be more solid than flowable. At such temperatures, these glasses are more susceptible to cracks due to a significant differential between the coefficient of thermal expansion for such glasses and the coefficient of thermal expansion for the underlying carbon/carbon composite.

Borate glasses have been proposed for protection of carbon/carbon composites. A serious drawback for many $B_2O_3$ glasses is degradation by hydrolysis and leaching or evaporation under proposed operating conditions which include humid weather. The viscosity of such glasses may change widely with increasing temperature. Viscosity stabilized boron oxide glasses suitable for protection of carbon/carbon composites from oxidation are described in U.S. Pat. No. 4,795,677 to Gray, the disclosure of which is herein incorporated by reference. These glasses have proven effective in protecting carbon/carbon composites from oxidation in dry environments. Efforts to improve resistance to hydration and subsequent volatilization and/or leaching have not been entirely successful. Modified borate glass compositions, have exhibited carbon wetting and viscosity characteristics that represent significant compromises compared to borate glasses not modified in such a manner.

Accordingly, it is a general object of the present invention to provide carbon/carbon composites that have improved resistance to oxidation even when exposed to a moisture-containing environment.

SUMMARY OF THE INVENTION

Carbon/carbon composites having a moisture resistant oxidation protection system and methods of making same are provided. The carbon/carbon substrate is preferably provided during its manufacture with inhibitor particles that form a moisture resistant, viscosity stabilized borate glass when exposed to a high temperature, oxidizing environment, a sealant at the surface of the composite applied as a paint, preferably a multilayer paint including refractory granules and inhibitor particles that form a moisture resistant, viscosity-stabilized borate glass when exposed to a high-temperature, oxidizing environment, and a plurality of layers of ceramic material applied typically by CVI/CVD, subsequent to painting, which form an outer barrier or shell, e.g., of silicon carbide or silicon nitride, in which the cracks through the outer ceramic shell are sealed by the borate glass formed upon exposure to a high-temperature, oxidizing environment.

Suitable carbon/carbon substrate inhibitor compositions have been made containing glass precursor compounds (B or $B_4C$, $SiO_2$, $Li_2ZrO_3$, and $Li_2SiO_3$) or glass frits with a molar composition when fully oxidized in the range: $B_2O_3$ 40%–80%; $SiO_2$ 5%–30%; $Li_2O$ 7%–20%; $ZrO_2$ 7%–10%.

The paint sealant coat is formed using inhibitor compositions similar to those used to treat the matrix of the carbon/carbon substrate. The paint is prepared by mixing finely divided powders of borate glass precursor compounds or borate glass frit of 75 micrometers (200 mesh) or less size with a carbon char yielding precursor such as phenolic resin or pitch and granular silicon carbide. In a preferred multi-layer sealant system, there is first applied an inner sealant layer comprising a boron rich inhibitor system similar to that employed for treatment of the matrix of the carbon/carbon substrate, including very finely divided and coarser particles of boron-containing material and a carbon precursor such as pitch. Over the inner sealant layer is applied an outer sealant layer comprising finely divided precursors of viscosity stabilized borate glass, granular refractory material, a carbon precursor such as pitch, and optionally a borate glass frit.

The sealant painted carbon/carbon substrate is thereafter subjected to CVI/CVD in situ formation of $B_xC$ (wherein x is nominally about 4) which penetrates the porous carbonized sealant layers and underlying carbon/carbon substrate to a limited extent, followed by CVI/CVD application of silicon carbide to form an outer ceramic shell having a total thickness of from about 4–12 mils and preferably 8–10 mils, the $B_xC$ layer having a thickness of about one half mil.

The intermediately positioned sealant layers provide a source of sealing glass to close any cracks in the refractory barrier coating which may exist or subsequently arise, and a reservoir of boron to replenish loss at the outer surface of the outer ceramic shell due to hydration, leaching or evaporation, and may help to accommodate differential thermal expansion between the refractory barrier coating and the carbon/carbon composite.

The carbon/carbon substrate matrix and paint sealant initially each include boron or a boron oxide precursor, or both, and other refractory oxides or refractory oxide precursors. In an oxidizing atmosphere, boron and such refractory oxide precursors scavenge oxygen to form oxides and together form a glass. Because the oxides occupy a substantially larger volume than the precursors, as the precursors oxidize, they expand to fill the pores within the composite and also to completely cover its inner structural surfaces. Boron oxides and other refractory oxides fuse together at high temperatures to form a glass which coats the pore surfaces and wets the structural graphite or carbon fiber surfaces, thereby acting as a barrier to oxidation of the underlying carbon/carbon composite. The glass which forms in the sealant coat is present and available to flow into and fill cracks which develop or were has a stabilized viscosity over a wide temperature range, it is prevented from simply oozing out of the cracks in the outer refractory shell. The composition of the glass inhibits vaporization, hydrolysis and leaching of the borate component at the outer surface of the refractory shell. Presence of the larger particles of boron-containing material enables replenishment of boron losses at the surface of the carbon/carbon maintain composition of a suitable viscosity stabilized borate glass to seal cracks existing in the outer ceramic shell. According to an aspect of the invention, there is provided an oxidation-resistant structure comprising throughout, the substrate having in its as-manufactured (carbonized) state prior to substantial exposure in an oxidizing atmosphere at elevated temperatures, a multi-layer oxidation protection system including a) an inner sealant layer having boron and other metals or metalloids, in elemental form and/or as an oxide or oxidizable moiety, dispersed throughout a carbonaceous binder, the boron expressed as boron being present in amount of from about 50 to 100 weight percent excluding binder, the other metals or metalloids when expressed as oxides being present in amount of from about 0 to 50 weight percent excluding binder, the carbonaceous binder being present in amount of 15–40% by weight of the total inner sealant layer prior to carbonization, the carbonaceous binder forming pores upon carbonization to provide the inner sealant layer in its carbonized form with from about 20 to about 50 volume percent porosity, said boron and said metal or metalloid oxidizing when exposed to a high temperature, oxidizing environment to form boron oxide and one or more metal or metalloid oxides within the pores of the inner sealant layer, at high temperatures the metal or metalloid oxide or oxides which form stabilizing the viscosity of the molten borate glass which forms;

b) an outer sealant layer comprising boron, silicon, lithium, and zirconium, in elemental form and/or as an oxide or oxidizable moiety, and refractory granules dispersed in a carbonaceous binder, the boron expressed as boron being present in amount of from about 10 to 50 weight percent, the silicon expressed as silicon dioxide present in amount of from about 0 to 25 weight percent, lithium expressed as lithium oxide ($Li_2O$) in amount of from about 0 to about 10 weight percent and zirconium expressed as zirconia in amount from about 0 to about 30 weight percent and refractory granules in amount of about 20 to 80 weight percent, all of the foregoing expressed in percent by weight of the total outer sealant composition exclusive of the carbonaceous binder, the carbonaceous binder being present in amount from about 15 weight percent to about 40 weight percent of the total outer sealant composition prior to carbonization, the amount and character of the carbonaceous binder being such as to provide from about 20 to 50 volume percent porosity of the outer sealant composition exclusive of the volume occupied by the refractory particles upon carbonization of the outer sealant layer, said boron and other metals or metalloids oxidizing when exposed to a high temperature, oxidizing environment to form boron oxide and a metal oxide or a metalloid oxide within the pores of said outer sealant layer, and at high temperatures stabilizing the viscosity of the molten borate glass which forms and reducing loss of boron due to exposure to moisture.

In certain embodiments of the invention, the pores of the inner and outer sealant layers in their carbonized form have an average size of between about 5 and 25 micrometers.

According to a further embodiment of the invention, the aforedescribed structure may further comprise a CVI/CVD inner ceramic layer of $B_xC$ overlying the outer sealant layer, said inner ceramic layer having a thickness of about 5 to about 25 micrometers, and an outer refractory ceramic layer overlying the inner ceramic layer.

According to a further embodiment of the invention, the inner sealant layer of the aforedescribed structure includes, expressed as weight percent of total boron in the inner sealant layer, from 20 percent to 100 percent submicron boron and the remainder of the boron in the inner sealant layer has a particle size of greater than one micrometer and less than 50 micrometers, the boron being in elemental form and/or as an oxidizable carbide or nitride.

According to a further embodiment of the invention, the outer sealant layer includes, expressed as weight percent of total boron in the outer sealant layer, from 20 percent to 100 percent submicron boron and the remainder of the boron in the outer sealant layer has a particle size of greater than one micrometer and less than 50 micrometers, the boron being in elemental form and/or as an oxidizable carbide or nitride. According to a further embodiment of the invention, the outer sealant prior to carbonization comprises particulate boron carbide in amount of from about 10 to about 40 weight percent of outer sealant, particulate $SiO_2$ in amount of from about 2 to about 10 weight percent of outer sealant, particulate $Li_2ZrO_3$ in amount of from about 4 to about 20 weight percent of outer sealant and granular silicon carbide having a particle size between about 100 micrometers (120 grit) and about 70 micrometers (180 grit) in amount of from about 30 to about 70 percent by weight of outer sealant and pitch in amount of from about 15 to about 40 percent by weight of outer sealant, said percentages being exclusive of any solvent used to dilute the pitch.

According to another embodiment of the invention, the aforedescribed structure includes a metal or metalloid in elemental form and/or as in oxide or oxidizable moiety, is dispersed throughout said carbon/carbon substrate and comprising between about 1 and about 10 weight percent of said substrate, and boron, in elemental form and/or as an oxidizable moiety, said boron being dispersed throughout said substrate and comprising between about 2 and about 20 weight percent of said substrate, said boron and said metal or metalloid oxidizing when exposed to a high temperature, oxidizing environment to form boron oxide and a metal oxide or metalloid oxide within the interstices and at the surface of said carbonaceous substrate, at high temperatures the metal and/or metalloid oxides which form stabilizing the viscosity of the molten borate glass which forms and providing resistance to loss of such boron oxide upon exposure to moisture. According to a further embodiment of the invention, the metal or metalloid comprises between about 2 and about 5 weight percent of said substrate, and boron comprises between about 3 and 10 weight percent of said substrate.

In certain embodiments, the metal or metalloid oxides are provided in the form of $ZrO_2$ and/or $SiO_2$ and/or $Li_2ZrO_3$ prior to exposure to a high temperature oxidizing environment.

According to a further aspect of the invention, there is provided an oxidation-resistant structure comprising a carbon/carbon substrate formed with interstices throughout, the substrate having in its as-manufactured (carbonized) state prior to substantial exposure in an oxidizing atmosphere at elevated temperature, a multilayer oxidation protection system including a layer of $B_xC$ having a thickness of from about 5 to about 25 micrometers which penetrates the carbon/carbon substrate.

According to a further embodiment of the invention, the oxidation-resistant structure includes a layer of silicon carbide overlying the $B_xC$ layer, the outer silicon carbide layer has a thickness of between about 100 and 300 micrometers.

According to a further aspect of the invention, the inner sealant layer of the structure comprises particulate boron carbide in amount of from about 50 to about 75 percent by weight of inner sealant; particulate zirconia in amount of from about 5 to about 15 percent by weight of inner sealant and pitch in amount of from about 15 to about 40 percent by weight of inner sealant prior to carbonization, said percentages being exclusive of any solvent used to dilute the pitch.

According to a further aspect of the invention, the outer sealant layer of the structure prior to carbonization comprises particulate boron carbide in amount of from about 10 to about 40 weight percent of 2 to about 10 weight percent of outer sealant, particulate $Li_2ZrO_3$ in amount of from about 4 to about 20 weight percent of outer sealant and granular silicon carbide having a particle size between about 100 micrometers (120 grit) and about 70 micrometers (180 grit) in amount of from about 30 to about 70 percent by weight of outer sealant and pitch in amount of from about 15 to about 40 percent by weight of outer sealant, said percentages being exclusive of any solvent used to dilute the pitch.

According to a further aspect of the invention there is provided an oxidation-resistant structure comprising a carbon/carbon substrate formed with interstices throughout, the substrate having in its as-manufactured (carbonized) state prior to substantial exposure in an oxidizing atmosphere at elevated temperature, a multi-layer oxidation protection system including a CVI/CVD layer of boron carbide having a thickness of from about 5 to about 25 micrometers which penetrates the carbon/carbon substrate, the multi-layer oxidation protection system including a sealant layer adjacent to said substrate having boron or boron carbide, refractory granules having a size from about 250 micrometers to about 50 micrometers and at least one compound selected from the group consisting of $SiO_2$, $ZrO_2$, $Li_2ZrO_3$, $SiSiO_3$ and glass frits dispersed in a carbonaceous binder, with a molar composition when fully oxidized: $B_2O_3$ 40–80 percent, $SiO_2$ 5–30 percent, $Li_2O$ 7–20 percent and $ZrO_2$ 7–10 percent, and a CVI/CVD ceramic outer shell having a total thickness from about 4 to 12 mils.

DETAILED DESCRIPTION OF THE PREFERRED EMBODIMENTS

Figure 1:
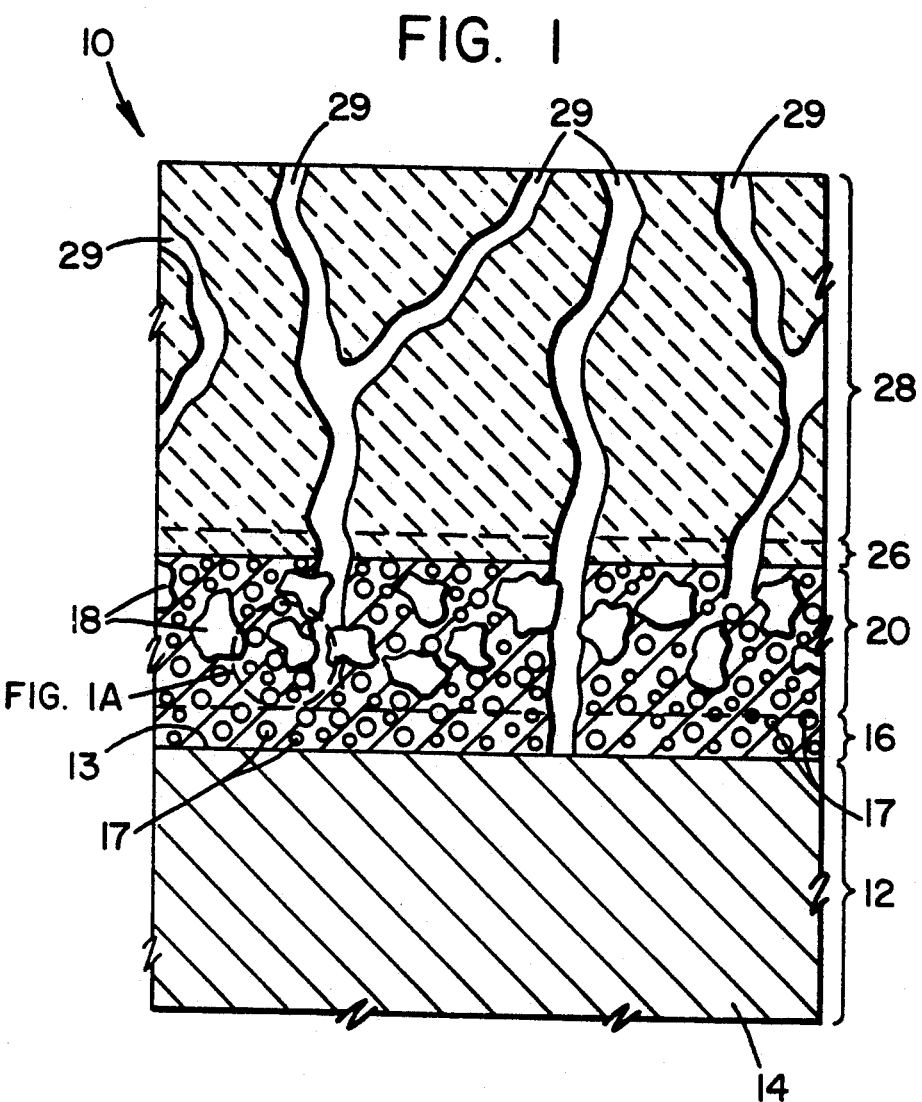
FIG. 1 is a diagrammatic representation of a carbon/carbon composite structure according to the present invention in its as-manufactured (carbonized but not oxidized) state before repeated thermal cycling in an oxidizing atmosphere.
Figure 1A:
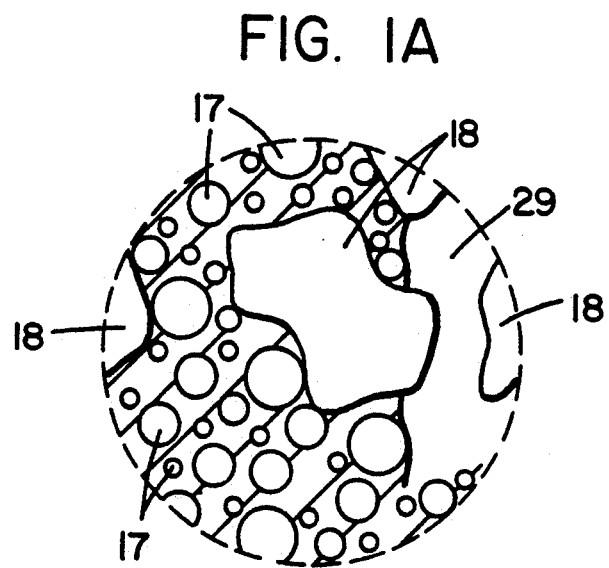
FIG. 1A is an enlarged view of the encircled portion of FIG. 1.
Figure 2:
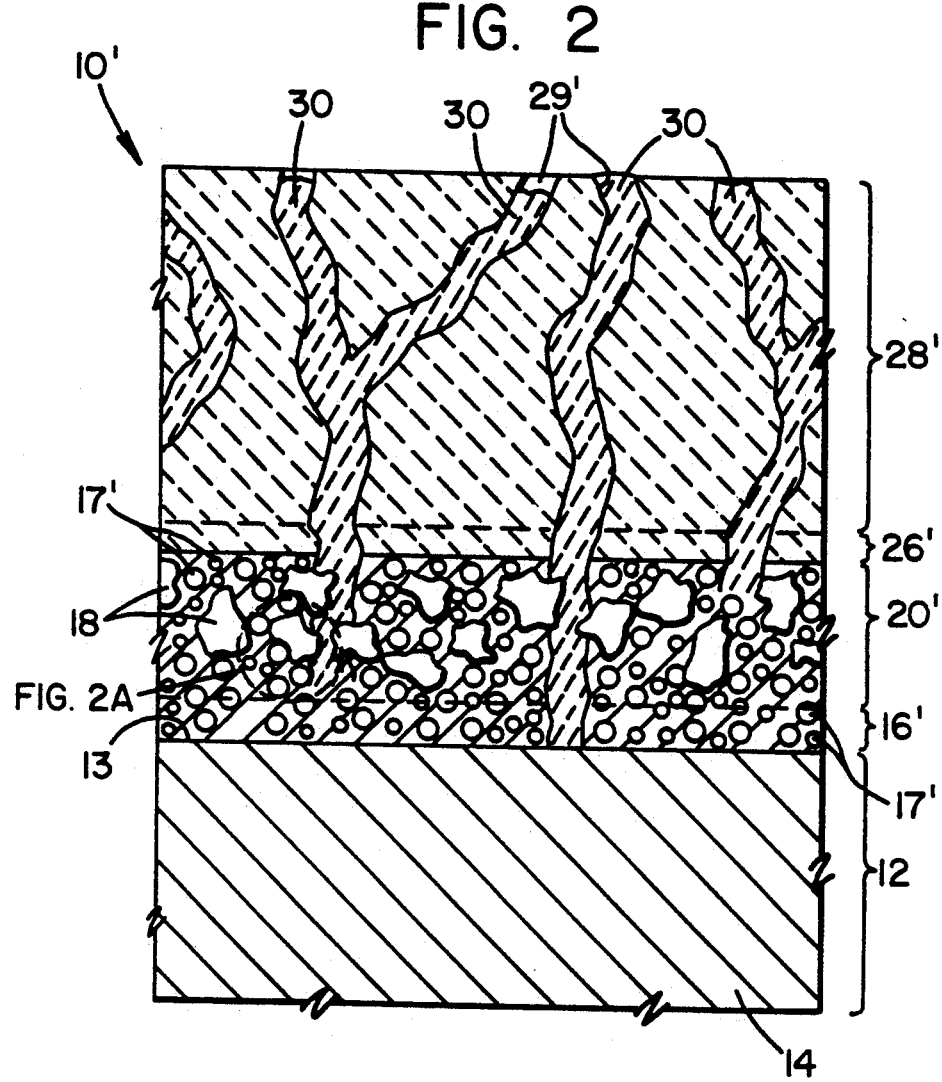
FIG. 2 is a diagrammatic representation of a carbon/carbon composite structure of FIG. 1 after repeated thermal cycling in an oxidizing atmosphere.
Figure 2A:
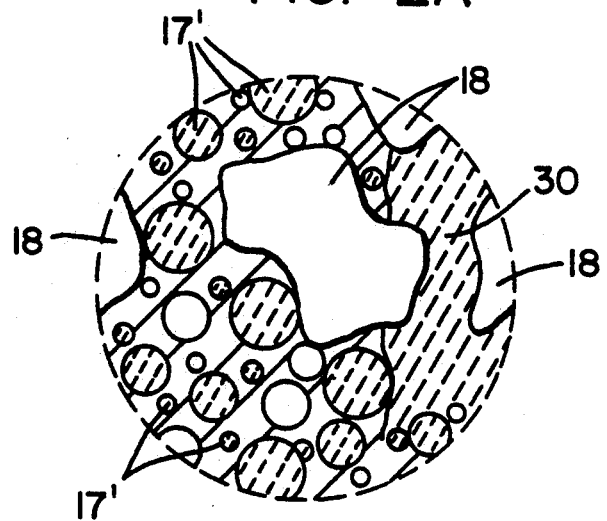
FIG. 2A is an enlarged view of the encircled portion of FIG. 2.

Referring to the drawings, FIGS. 1 and 2 depict portions of a carbon/carbon composite structure 10 made in accordance with the invention. The structure shown in FIG. 1 is depicted in its as-manufactured condition (carbonized but not oxidized) prior to repeated thermal cycling in an oxidizing atmosphere. The structure 10' shown in FIG. 2 is like that of FIG. 1 except that it has been exposed to repeated thermal cycling. The structures 10 and 10' include a carbon/carbon substrate 12 formed of carbonaceous fibers bonded by a matrix of carbonaceous material 14. Overlying the exterior surface 13 of the carbon/carbon substrate 12 are a plurality of layers 16, 20, 26, 28 in FIG. 1 and 16', 20', 26', 28' in FIG. 2 which together form a moisture resistant oxidation protection system for the underlying carbon/carbon substrate. Overlying the surface 13 of the carbon/carbon substrate 12 is a sealant which in preferred form comprises two sublayers 16 and 20 in FIG. 1 and 16' and 20' in FIG. 2.

Inner sealant layer 16 includes pores 17 in amount of about 20–50% by volume in its as-manufactured (carbonized but not oxidized) state, the pores typically having a size of about 25 micrometers ($\mu m$) (1 mil) and less, with a mean size typically about 5 to 8 $\mu m$ (0.2–0.3 mil). The pores are evenly distributed throughout sealant layer 16 Inner sealant layer 16 provides a boron-rich layer adjacent the carbon/carbon substrate. In practice, the sealant layer 16 is not as perfectly and discreetly distinct from the carbon/carbon substrate as depicted for purpose of simplifying illustrations in FIGS. 1 and 2, but rather penetrates to a limited extent into the interstices of the porous underlying carbon/carbon substrate. Sealant layer 16 comprises elemental boron or $B_4C$ and a zirconia source such as zirconia, zirconium diboride and possibly zircon sand. The particulate boron-containing material may be entirely of submicron size, but preferably is bimodal, with the large particles being at least ten times larger than the small particles and ranging up to about 50 micrometers, and comprising up to 80 percent of total boron in the inner sealant layer. In a preferred embodiment, inner sealant layer 16 is prepared from 59.6 weight percent of submicron $B_4C$, 11.4 weight percent of zirconium having a nominal particle size of about 1 micron and 29.0 weight percent of A-240 petroleum pitch available from Ashland Chemical Company. Zirconium or equivalent metals such as those discussed in U.S. Pat. No. 4,795,677, e.g., hafnium, titanium et al are included to level the viscosity over a wide temperature range of the borate glass which will be formed upon exposure to repeated thermal cycling in an oxidizing environment. Of these, zirconium is preferred.

Inner sealant layer is applied by painting or other conventional means in one or more coats to provide preferably from about 3 to about 5 $mg/cm^2$ of substrate surface area. While thickness of the inner sealant layer is exceedingly difficult to measure due to the porous nature of the substrate and penetration of the inner sealant into interstices of the substrate, the dried inner sealant layer preferably has a nominal thickness of less than one mil and more desirably about 0.8 mil.

Outer sealant layer 20 is composed of precursors, preferably of about micron or less particle size, to a ternary or quaternary borate glass, and a granular refractory material 18. Outer sealant layer 20 is porous in its as-manufactured (carbonized but not oxidized) state, the pores typically having a size of about 25 $\mu m$ (1 mil) and less with a mean size typically from about 5 to 8 $\mu m$ (0.2–0.3 mil) evenly distributed throughout. The particulate boron-containing material may be as described in reference to the inner sealant layer. The refractory particles may 18 range in size from about 250 $\mu m$ to about 50 $\mu m$ (60 mesh to 325 mesh American Standard Screen), and may be of any suitably refractory material which retains its particulate character throughout the manufacturing process and formation of the borate glass upon subsequent exposure to a high-temperature oxidizing atmosphere. Silicon carbide is especially preferred because it provides $SiO_2$ in the event of oxidative degradation. The pores occupy from about 20 to about 50% of the volume of sealant layer 20 exclusive of granular refractory material 18 in its carbonized state.

Preferred carbonaceous binders produce a highly porous structure upon carbonization.

A particularly preferred composition for outer sealant layer 20 is made from submicron $B_4C$ in amount of 30 weight percent, submicron $SiO_2$ in amount of 5 weight percent, $Li_2ZrO_3$ in amount of 15 weight percent, and particulate silicon carbide in amount of 30 weight percent and A-240 petroleum pitch in amount of 20 weight percent diluted with suitable organic solvent such as toluene and/or tetrahydrofuran to reduce viscosity to enable application to the substrate, e.g., by brushing. The abrasive grade silicon carbide particles are about 85 micrometers (150 grit). In this preferred outer sealant composition, zirconia or its equivalent is included to provide viscosity stabilization of the $B_2O_3$ glass to be formed upon subsequent exposure to a high temperature, oxidizing atmosphere. Lithium is included to reduce loss of the boron from the borate glass upon exposure to atmospheric moisture through fractures 29. $Li_2ZrO_3$ is preferred as a source for lithium and zirconium because it has a higher melting point than other commonly available lithium compounds suitable for practice of the invention. $Li_2O$ is not desired as a source for lithium because of its hygroscopic nature and conversion to hydroxide.

Moisture resistance of the resultant sealant glass which forms upon exposure to thermal cycling in an oxidizing environment is due to a combination of $B_2O_3$, $Li_2O$, $SiO_2$, and $ZrO_2$ having the following molar composition:

| | |
|---|---|
| $B_2O_3$ | 40–80% |
| $SiO_2$ | 5–30% |
| $Li_2O$ | 7–20% |
| $ZrO_2$ | 7–10%. |

$ZrO_2$ is included to provide viscosity stabilization or leveling over a wide temperature range.

In certain embodiments a third sealant layer (not shown in the drawing) overlying the previously described outer sealant layer is provided, having a composition similar or identical to the inner sealant layer. In a preferred embodiment, an oxidation inhibited carbon/carbon substrate was provided with an inner sealant layer in amount of 3 $mg/cm^2$ dry weight having the composition: 59.6 weight percent $B_4C$, 11.4 weight percent $ZrO_2$ and 29.0 weight percent pitch; an outer sealant layer in amount of 9 $mg/cm^2$ dry weight having the composition 10.9 weight percent $B_4C$, 6.4 weight percent $ZrO_2$, 65.8 weight percent 150 grit silicon carbide and 16.9 weight percent pitch; and a third sealant layer in amount of 11 mg/cm$^2$ dry weight of the same composition as the inner sealant layer. Overlying outermost sealant layer 20 is an inner ceramic layer 26 of B$_x$C (wherein x may vary widely from 2 to 6 or even much greater but preferably and typically is about 4) formed by CVI/CVD having a thickness of about one-half mil. This CVD B$_x$C layer 26 while discernable during microscopic analysis or Auger analysis does not merely lie upon the sealant layer 20 but permeates to an extent into sealant layer 20 and preferably into inner sealant layer 16 and the carbon/carbon substrate 12. It is, however, shown as a discrete and distinct layer separate from sealant layer 20 in FIGS. 1 and 2 for purposes of simplifying illustration.

An outer ceramic layer or shell 28 of silicon carbide or other refractory ceramic coating is applied over the B$_x$C coating. In preferred embodiments, two successive CVI/CVD applications of SiC are provided, the composite part being turned in the furnace prior to initiation of the second CVI/CVD silicon carbide coating operation so as to insure that no region of the substrate is uncoated. The total thickness of the refractory ceramic shell is preferably in the range of 8-10 mils. For each of the inner and outer ceramic layers 26 and 28, CVI/CVD conditions that favor infiltration of the ceramic coating material into the porous carbonized sealant layers and the carbon/carbon substrate are preferred. These conditions tend to produce more adherent coatings. For the B$_x$C layer CVI/CVD at about 100 Torr has been found suitable. For the CVI/CVD silicon carbide layer, subatmospheric conditions of from about 25 to about 600 Torr and more preferably about 25 to about 200 Torr have been found suitable. Preferred CVI/CVD processing conditions result in deposition of the desired ceramic materials within pores of the carbonized sealant layers and underlying carbon/carbon substrate 12 rather than merely coating the exposed outer surface of the outermost sealant layer 20.

In an alternate embodiment, sealant paints are formed containing glass frit. The sealant paint has the following composition: powdered glass frit, less than 75 $\mu$m (200 mesh American Standard Screen), 40-60 weight percent with preferred value being about 50 weight percent; granular silicon carbide having a particle size of 85 mm (150 grit) in amount of 10-30 weight percent with preferred value being about 10 weight percent; powdered graphite in an amount of 0-25 weight percent, with a preferred value being 25 weight percent and petroleum pitch in amount of 15-30 weight percent with a preferred value being about 25 weight percent. The powdered glass frit itself has the following molar composition (fully oxidized) in the range B$_2$O$_3$ 40-80 percent, SiO$_2$ 5-30 percent, Li$_2$O 7-20 percent, and ZrO$_2$ 7-10 percent. This sealant paint composition may be used in place of that described hereinabove for layer 20, the outermost sealant layer.

Although not preferred, an alternative approach to reducing the moisture sensitivity of the borate sealant glasses, which may give less volatile glasses than those described hereinabove, is to replace some or all of the lithium in the formulations by calcium, aluminum, or barium. The oxides of these metals are known to improve chemical durability of borosilicate glasses. It is important to avoid use of those metals or compounds which are highly reactive with carbon and for this reason lithium is preferred to other alkaline and alkaline earth metals.

In preferred embodiments, the carbon/carbon substrate contains an oxidation inhibitor, e.g., of similar or the same composition as the sealant, which is mixed with a carbonaceous resin material, e.g., a phenolic or pitch, which is then impregnated into an assemblage of fibers of graphite or fibrous graphite or carbon precursor to form plies. Typically, the inhibitor comprises from about 3 to about 30 percent by weight of the carbon/carbon substrate.

The carbon/carbon substrate of carbon/carbon structure 10 is formed in the usual manner by, for example, the laying up of resin prepregged fabrics to form a preform, pyrolyzing the preform and thereafter densifying the pyrolyzed structure employing conventional well-known techniques such as carbon CVI/CVD or liquid impregnation and carbonizing of the impregnate. Multiple CVI/CVD or liquid impregnation and carbonization cycles or combinations of both may be employed for forming densified structures as is well-known in the art. Suitable impregnates include furan and phenolic resins, petroleum and coal tar pitch.

Good adhesion of the sealant system and refractory shell is usually obtained if the substrate is clean and does not have an impervious carbon surface glaze from the densification process. Cleaning may be accomplished in known manner, e.g. by grinding, polishing or sand blasting.

Having reference now to FIG. 2, there is shown a representation of a structure like that of FIG. 1 after exposure to repeated thermal cycling in an oxidizing environment. Fractures 29' which extend through the outer ceramic refractory shell 26, 28 into the sealant layers below are at least partially filled with a viscosity leveled, moisture-resistant borosilicate glass 30. The pores 17' within sealant layers 20' and 16' are somewhat enlarged as compared to their as-manufactured (carbonized) size due to oxidation filled with borosilicate glass. The cracks 29' may extend completely through the sealant layers 16', 20' and slightly into the outer region of the carbon/carbon substrate 12 and after extensive thermal cycling in an oxidizing environment borosilicate glass will also be present in pores of the substrate 12.

Figure 3:
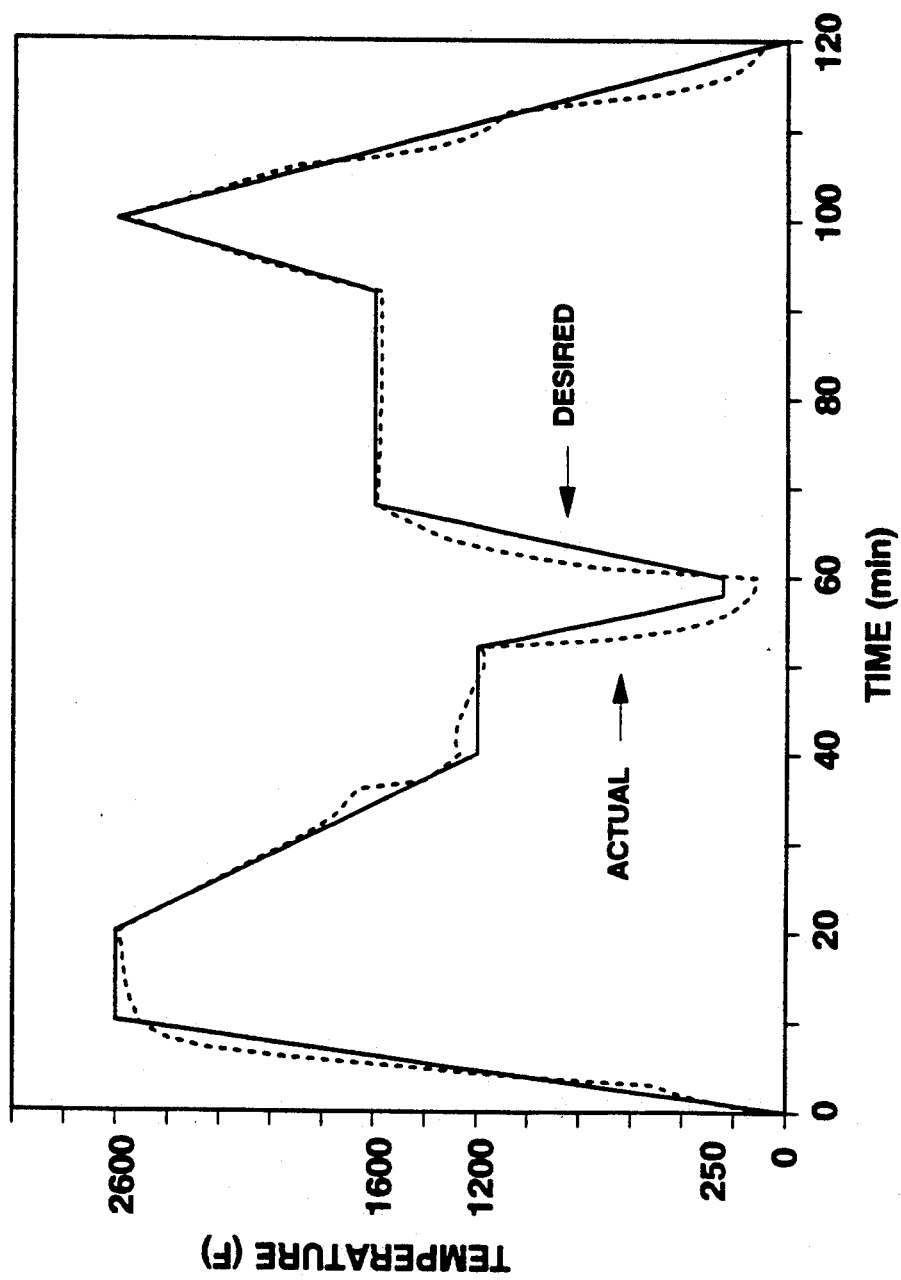
FIG. 3 graphically represents an oxidation resistance test cycle.

In FIG. 3 there is shown an oxidation resistance screening cycle which can be run continuously, with occasional breaks to weigh samples. The solid line depicts the desired cycle; the dashed line depicts the actual cycle observed. The cycle may also be interrupted periodically to expose samples to humidity.

The invention will now be described in greater detail by way of an example of a highly preferred embodiment which is intended to exemplify but not limit the scope of the present invention.

Heat treated T-300 8-harness satin weave fabric was impregnated with the substrate inhibitor composition of Table 1. The inhibitor powders were dispersed in phenolic resin (SC1008 available from Borden Chemical Company). The impregnated fabric was B-staged. Thereafter ten plys were laid up to form a panel of about 10×12 inches. The panel was press cured, then carbonized and CVI/CVD carbon densified to about 1.8 g/cc. The panel was cut into coupons of about 1×1/1-2 inches. The coupons were painted with paint layer 1 inhibitor composition given in Table 1. Paint 1 was diluted with a 50/50 blend of tetrahydrofuran and toluene solvent to brushing consistency. After oven drying Paint 1, four layers of Paint 2 were applied with oven drying occurring between each. Paint 2 composition is given in Table 1. The painted coupons were then carbonized in an inert atmosphere to about 850° C.

Figure 4:
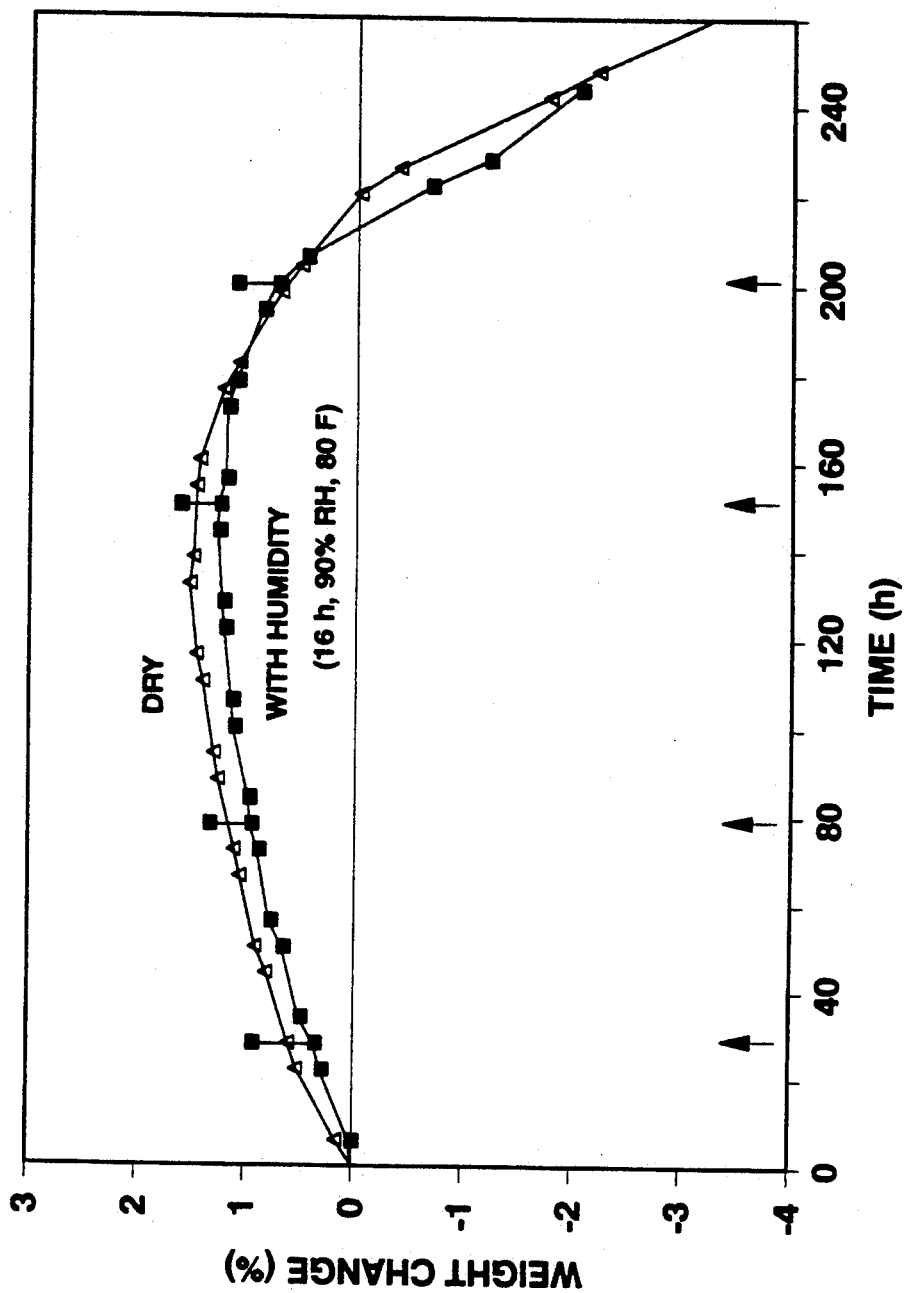
FIG. 4 graphically depicts the relative weight gain or loss of a preferred oxidation resistant carbon/carbon composite structure according to the invention upon thermal cycling with periodic humidity exposure.

Thereafter the coupons were subjected to CVI/CVD of $B_xC$ to deposit about one-half mil and without removal from the furnace subjected to CVI/CVD of silicon carbide until about half of the total thickness of the shell was formed. The coupons were repositioned in the furnace and the remainder of the silicon carbide shell was deposited. The total thickness of the shell was about 8 mils. Two sets of the completed oxidation-protected coupons were then subjected to the oxidation cycle shown in FIG. 3 at one atmosphere pressure in flowing air. One set of coupons was periodically exposed to humidity as indicated on FIG. 4. FIG. 4 shows that representative coupons exhibited good resistance to oxidation under dry and humid conditions.

TABLE I

| Sample Construction | Inhibitor Composition (wgt. %) | | | | | | |
|---|---|---|---|---|---|---|---|
| | B | $B_4C$ | $ZrO_2$ | $SiO_2$ | $Li_2ZrO_3$ | SiC | Pitch |
| Substrate | — | 59.4 | — | 11.4 | 29.2 | — | — |
| Paint Layer 1 | — | 59.6 | 11.4 | — | — | — | 29.0 |
| Paint Layer 2 | — | 30.0 | — | 5.0 | 15.0 | 30.0 | 20.0 |

What is claimed is:

1. An oxidization-resistant structure comprising a carbon/carbon substrate formed with interstices throughout, the substrate having in its as-manufactured (carbonized) state prior to substantial exposure in an oxidizing atmosphere at elevated temperatures, a multilayer oxidation protection system including
    a) an inner sealant layer having boron and other metals, in elemental form or as an oxide or oxidizable moiety or mixture of any of the foregoing chemical forms, dispersed throughout a carbonaceous binder, the boron expressed as boron being present in amount of from about 50 to 100 weight percent excluding binder, the other metals when expressed as oxides being present in amount of from about 0 to 50 weight percent excluding binder, the carbonaceous binder being present in amount of 15–40% by weight of the total inner sealant layer prior to carbonization, the carbonaceous binder forming pores upon carbonization to provide the inner sealant layer in its carbonized form with from about 20 to about 50 volume percent porosity, said boron and said metal oxidizing when exposed to a high temperature, oxidizing environment to form boron oxide and one or more metal oxides within the pores of the inner sealant layer, at high temperatures the metal oxide or oxides which form stabilizing the viscosity of the molten borate glass which forms; and adjacent thereto
    b) an outer sealant layer comprising boron, silicon, and zirconium, in elemental form or as an oxide or oxidizable moiety or mixture of any of the foregoing chemical forms, and lithium as an oxide or oxidizable moiety or mixture of the foregoing chemical forms, and refractory granules having a size from about 250 micrometers to about 50 micrometers dispersed in a carbonaceous binder, the boron expressed as boron being present in amount of from about 10 to 50 weight percent, the silicon expressed as silicon dioxide present in amount of from about 0 to 25 weight percent, lithium expressed as lithium oxide ($Li_2O$) in amount of from about 0 to about 10 weight percent and zirconium expressed as zirconia in amount from about 0 to about 30 weight percent and refractory granules in amount of about 20 to 80 weight percent, all of the foregoing expressed in percent by weight of the total outer sealant exclusive of the carbonaceous binder, the carbonaceous binder being present in amount from about 15 weight percent to about 40 weight percent of the total outer sealant prior to carbonization, the carbonaceous binder forming pores upon carbonization to provide the outer sealant layer exclusive of the volume occupied by the refractory granules with from about 20 to about 50 volume percent porosity, said boron, silicon, zirconium, and lithium oxidizing when exposed to a high temperature, oxidizing environment to form boron oxide and a metal oxide within the pores of said outer sealant layer, and at high temperatures stabilizing the viscosity of the molten borate glass which forms and reducing loss of boron due to exposure to moisture.

2. The structure of claim 1 in a carbonized state prior to substantial exposure in an oxidizing atmosphere at elevated temperatures,
    a) the inner sealant layer having boron and other metals, in elemental form or as an oxide or oxidizable moiety or mixture of any of the foregoing chemical forms, dispersed throughout a carbonized carbonaceous binder, the boron expressed as boron being present in amount of from about 50 to 100 weight percent excluding binder, the other metals when expressed as oxides being present in amount of from about 0 to 50 weight percent excluding binder, the inner sealant layer in its carbonized state having from about 20 to about 50 volume percent porosity, said boron and said metal oxidizing when exposed to a high temperature, oxidizing environment to form boron oxide and one or more metal oxides within the pores of the inner sealant layer, at high temperatures the metal oxide or oxides which form stabilizing the viscosity of the molten borate glass which forms; and adjacent thereto
    b) the outer sealant layer comprising boron, silicon, and zirconium, in elemental form or as an oxide or oxidizable moiety or mixture of any of the foregoing chemical forms, and lithium as an oxide or oxidizable moiety or mixture of the foregoing chemical forms, and refractory granules having a size from about 250 micrometers to about 50 micrometers dispersed in a carbonized carbonaceous binder, the boron expressed as boron being present in amount of from about 10 to 50 weight percent, the silicon expressed as silicon dioxide present in amount of from about 0 to 25 weight percent, lithium expressed as lithium oxide ($Li_2O$) in amount of from about 0 to about 10 weight percent and zirconium expressed as zirconia in amount from about 0 to about 30 weight percent and refractory granules in amount of about 20 to 80 weight percent, all of the foregoing expressed in percent by weight of the total outer sealant composition exclusive of the binder, the outer sealant layer having from about 20 to 50 volume percent porosity exclusive of the volume occupied by the refractory particles, said boron, silicon, zirconium, and lithium oxidizing when exposed to a high temperature, oxidizing environment to form boron oxide and a metal oxide within the pores of said outer sealant layer, and at high temperatures stabilizing the viscosity of the molten borate glass which forms and reducing loss of boron due to exposure to moisture.

3. The structure of claim 1 wherein the pores of the inner and outer sealant layers have an average size of between about 5 and about 25 micrometers.

4. The structure of claim 2 further comprising a CVI/CVD inner ceramic layer of boron carbide overlying the outer sealant layer, said inner ceramic layer having a thickness of about 5 to about 25 micrometers, and an outer refractory ceramic layer overlying the inner ceramic layer.

5. The structure of claim 4, wherein the inner ceramic layer penetrates and coats the surfaces of the pores of the underlying outer and inner sealant layers and carbon/carbon substrate.

6. The structure of claim 1 wherein the inner sealant layer includes, expressed as weight percent of total boron in the inner sealant layer, from 20 percent to 100 percent submicron boron and the remainder of the boron in the inner sealant layer has a particle size of greater than one micrometer and less than 50 micrometers, the boron in the inner sealant layer being in elemental form or an oxidizable carbide or nitride or mixture of any of the foregoing chemical forms.

7. The structure of claim 6 wherein the outer sealant layer includes, expressed as weight percent of total boron in the outer sealant layer, from 20 percent to 100 percent submicron boron and the remainder of the boron in outer sealant layer has a particle size of greater than one micrometer and less than 50 micrometers, the boron in the outer sealant layer being in elemental form or as an oxidizable carbide or nitride or mixture of any of the foregoing chemical forms.

8. The structure of claim 6 wherein inner sealant prior to carbonization comprises particular boron carbide in amount of from about 50 to about 75 percent by weight of inner sealant; particulate zirconia in amount of from about 5 to about 15 percent by weight of inner sealant and pitch in amount of from about 15 to about 40 percent by weight of inner sealant, said percentages being exclusive of any solvent used to dilute the pitch.

9. The structure of claim 8 wherein the outer sealant prior to carbonization comprises particulate boron carbide in amount of from about 10 to about 40 weight percent of outer sealant, articulate $SiO_2$ in amount of from about 2 to about 10 weight percent of outer sealant, particulate $Li_2ZrO_3$ in amount of from about 4 to about 20 weight percent of outer sealant and granular silicon carbide having a particle size between about 100 micrometers (120 grit) and about 70 micrometers (180 grit) in amount of from about 30 to about 70 percent by weight of outer sealant and pitch in amount of from about 15 to about 40 percent by weight of outer sealant, said percentages being exclusive of any solvent used to dilute the pitch.

10. The structure of claim 9 which when exposed to a high temperature, oxidizing environment forms a moisture resistant, viscosity stabilized molten borosilicate glass which fills the pores of the inner and outer sealant layers and cracks which exist in the inner and outer ceramic layers.

11. The structure of claim 1 further comprising a third sealant layer overlying said outer sealant layer and having a compositional range corresponding to that of said inner sealant layer.

12. The structure of claim 1 wherein a metal, in element forms or an oxide or oxidizable moiety or mixture of any of the foregoing chemical forms, is dispersed throughout said carbon/carbon substrate and comprising between about 1 and about 10 weight percent of said substrate, and boron, in elemental form or as an oxidizable moiety or mixture of any of the foregoing chemical forms, said boron being dispersed throughout said substrate and comprising between about 2 and about 20 weight percent of said substrate, said boron and said metal oxidizing when exposed to a high temperature, oxidizing environment to form boron oxide and a metal oxide within the interstices and at the surface of said substrate, at high temperatures the metal oxides which form stabilizing the viscosity of the molten borate glass which forms and providing resistance to loss of such boron oxide upon exposure to moisture.

13. The structure of claim 12 wherein the metal dispersed throughout the carbon/carbon substrate comprises between about 2and about 5percent percent to fisst substrate, and boron dispersed throughout said substrate comprises between about 3 and about 10 weight percent of said substrate.

14. The structure of claim 12 wherein the boron dispersed throughout said substrate is present in elemental form or in the form of boron carbide prior to exposure of the substrate to a high temperature oxidizing environment.

15. The structure of claim 14 wherein the metal oxide dispersed throughout the carbon/carbon substrate is provided in the form of $ZrO_2$ or $SiO_2$ or $Li_2ZrO_3$ or mixtures of any of these compounds prior to exposure to a high temperature oxidizing environment.

16. An oxidation-resistant structure comprising a carbon/carbon substrate formed with interstices throughout, the substrate having in its as-manufactured state prior to substantial exposure in an oxidizing atmosphere at elevated temperature, a multi-layer oxidation protection system including a sealant layer having refractory granules, boron or boron carbide and at least one compound selected from the group consisting $SiO_2$, $ZrO_2$, $Li_2ZrO_3$, $LiSiO_3$ and glass frits, with a molar composition exclusive of the refractory granules when fully oxidized: $B_2O_3$ 40–80 percent, $SiO_2$ 5–30 percent, $Li_2O$ 7–20 percent and $ZrO_2$ 7–10 percent, and a CVI/CVD layer of boron carbide having a thickness of from about 5 to about 25 micrometers which penetrates the sealant layer and carbon/carbon substrate.

17. The structure of claim 16 further comprising a layer of silicon carbide overlying the boron carbide layer.

18. The structure of claim 17 wherein the silicon carbide is formed by CVI/CVD.

19. The structure of claim 17 wherein the silicon carbide layer penetrates the sealant layer and carbon/carbon substrate.

20. The structure of claim 16 further including an outer silicon carbide layer having a thickness of between about 100 and 300 micrometers.

21. An oxidation-resistant structure comprising a carbon/carbon structure formed with interstices throughout, the substrate having in its as-manufactured state prior to substantial exposure in an oxidizing atmosphere at elevated temperature, a multi-layer oxidation protection system including a CVI/CVD layer of boron carbide having a thickness of from about 5 to about 25 micrometers which penetrates the carbon/carbon substrate, the structure further including a sealant layer underlying the CVI/CVD layer of boron carbide, the sealant layer comprising boron, silicon, and zirconium, in elemental form or as an oxide or oxidizable moiety or mixture of any of the foregoing chemical forms, and lithium as an oxide or oxidizable moiety or mixture of the forgoing chemical forms, and refractory granules having a size from about 250 micrometers to about 50 micrometers dispersed in a carbonaceous binder, the boron expressed as boron being present in amount of from about 10 to 50 weight percent, the silicon expressed as silicon dioxide present in amount of from about 0 to 25 weight percent, lithium expressed as lithium oxide ($Li_2O$) in amount of from about 0 to about 10 weight percent and zirconium expressed as zirconia in amount from about 0 to about 30 weight percent and refractory granules in amount of about 20 to 80 weight percent, all of the foregoing expressed in percent by weight of the total sealant layer exclusive of the carbonaceous binder, the amount and character of the carbonaceous binder providing from about 20 to 50 volume percent porosity of the sealant layer exclusive of the volume occupied by the refractory particles, said boron silicon, zirconium, and lithium oxidizing when exposed to a high temperature, oxidizing environment to form boron oxide and a metal oxide within the pores of said sealant layer, and at high temperatures stabilizing the viscosity of the molten borate glass which forms and reducing loss of boron due to exposure to moisture.

22. An oxidation-resistant structure comprising a carbon-carbon substrate formed with interstices throughout, the substrate having in its as-manufactured state prior to substantial exposure in an oxidizing atmosphere at elevated temperatures, a multi-layer oxidation protection system including a sealant layer having refractory granules, boron or boron carbide and at least one compound selected from the group consisting $SiO_2$, $ZrO_2$, $Li_2ZrO_3$, $LiSiO_3$ and glass frits, with a molar composition exclusive of the refractory granules when fully oxidized: $B_2O_3$ 40–80 percent, $SiO_2$ 5–30 percent, $Li_2O$ 7–20 percent and $ZrO_2$ 7–10 percent, and a multilayered ceramic outer shell adjacent to said sealant layer having a total thickness from about 4 to 12 mils.

23. An oxidation-resistant structure comprising a carbon/carbon substrate formed with interstices throughout, the substrate having in its as-manufactured state prior to substantial exposure in an oxidizing atmosphere at elevated temperature, a multi-layer oxidation protection system including a CVI/CVD layer of boron carbide having a thickness of from about 5 to about 25 micrometers which penetrates the carbon/carbon substrate, the multi-layer oxidization protection system including a sealant layer adjacent to said substrate having boron or boron carbide, refractory granules having a size from abut 250 micrometers to about 50 micrometers and at least one compound selected from the group consisting of $SiO_2$, $ZrO_2$, $Li_2ZrO_3$, $LiSiO_3$ and glass frits dispersed in a carbonaceous binder, with a molar composition when fully oxidized: $B_2O_3$ 40–80 percent, $SiO_2$ 5–30 percent, $Li_2O$ 7–20 percent and $ZrO_2$ 7–10 percent, and a CVI/CVD ceramic outer shell having a total thickness from about 4 to 12 mils.

* * * * *